May 29, 1962 A. D. ROSE 3,036,466
MAXIMUM POINTER INSTRUMENTS
Filed July 8, 1959
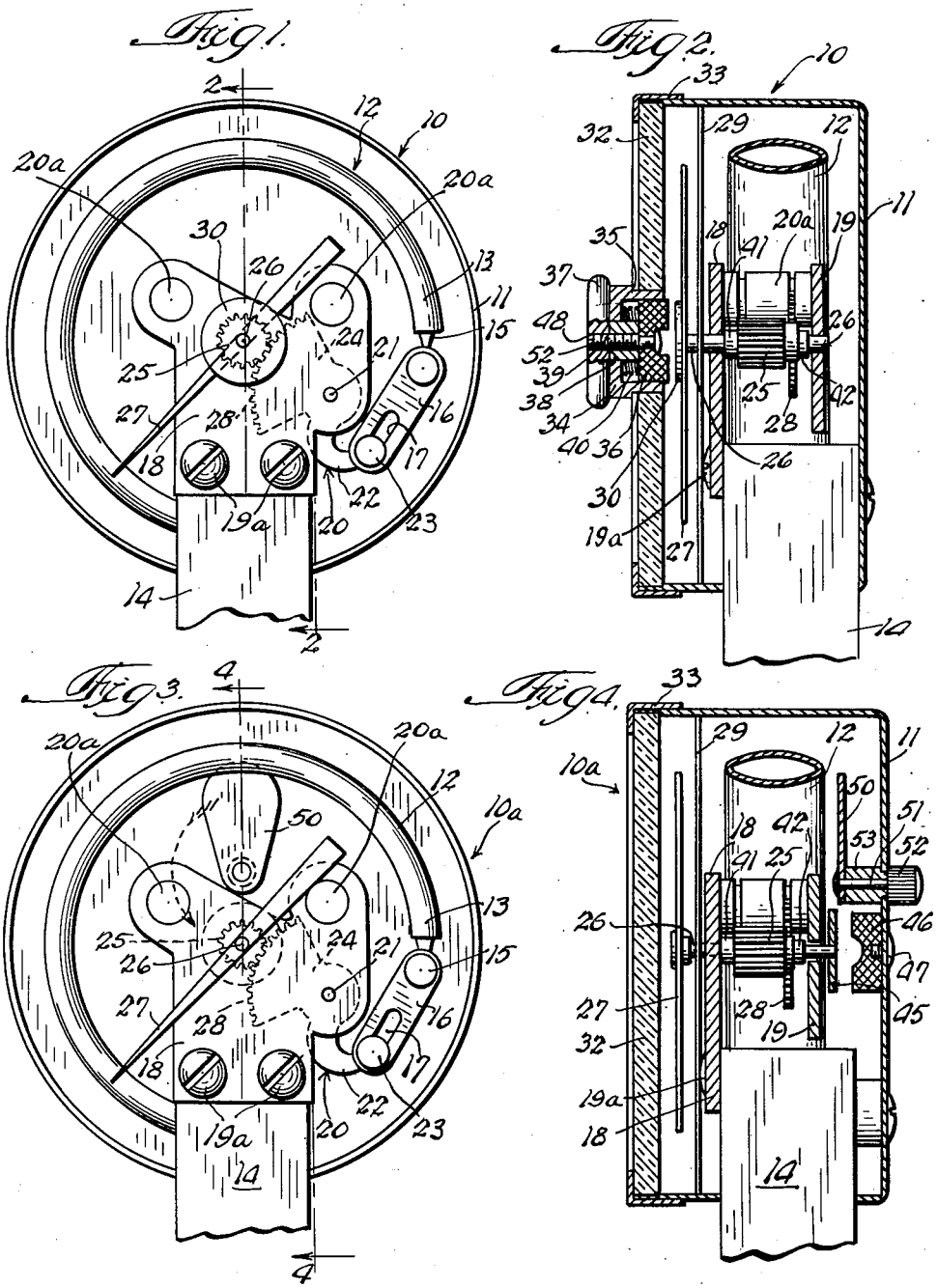
INVENTOR.
Alexander D. Rose.

United States Patent Office 3,036,466
Patented May 29, 1962

3,036,466
MAXIMUM POINTER INSTRUMENTS
Alexander D. Rose, Mount Prospect, Ill., assignor to Colorado Oil and Gas Corporation, Denver, Colo., a corporation of Delaware
Filed July 8, 1959, Ser. No. 825,786
10 Claims. (Cl. 73—396)

The present invention relates to gauges or other instruments employing pointers for indicating maximum readings, and has special reference to such instruments in which friction is employed for retaining a pointer in a position of maximum reading, and may be reduced to permit the instrument to return to zero position. More particularly, this invention relates to a maximum pointer gauge or other instrument wherein variable magnetic forces are used to increase and decrease the friction as required.

Maximum pointers are commonly employed in gauges recording pressures, temperatures and other physical conditions. In gauges of this type the maximum pointer is actuated by the particular condition-sensitive element employed in accordance with the state of the particular condition recorded.

With the conventional types of gauges, such as pressure gauges, the pointer shows the actual pressure at all times. Accordingly, when the pressure drops from its maximum, the pointer may be moved by the pressure-sensitive element to indicate the actual lower pressure. The hairspring or other return means commonly employed in such instruments also tends to return the indicator to zero position.

In a maximum pointer instrument having a single pointer, the pointer is retained at its maximum reading although the pressure or other condition has decreased or returned to zero. It is also possible to employ a separate maximum pointer in addition to the regular indicating pointer that shows the existing condition at all times. In this type of instrument the maximum pointer remains at maximum position while the indicating pointer continues to indicate actual pressure or other condition.

Instruments embodying the present invention utilize friction to retain the pointer in maximum position. Such instruments employ unidirectional transmission means between the condition-sensitive element and the pointer indicating the maximum condition so that movement is imparted to the pointer when the condition-sensitive element is actuated from its initial or zero position but will not reverse the movement of the pointer when the condition-sensitive element returns toward its initial or zero position. A hairspring or other return means is employed to return the pointer to initial or zero position upon the reduction of the friction which serves to retain the pointer in maximum position.

The friction utilized in the present invention must be very carefully controlled. While it must be sufficient to hold the pointer in maximum position against the tendency of the hairspring or other return means to move it toward its zero position, it must not be so great as to interfere with the accurate movement of the pointer resulting from the movement of the condition-sensitive element. Magnetic force that may be readily varied is employed to create the necessary friction.

In one embodiment of this invention a permanent magnet, preferably adjacent the front or back of the instrument, is positioned sufficiently close to a part of magnetic material fixed on or forming part of the pointer shaft, to pull the shaft toward the magnet and create friction between the shaft or an element thereon and the stationary supporting structure of the instrument. This friction is normally uniform irrespective of the amount of movement or position of the shaft and is sufficient to hold the pointer in maximum position. However, it may be reduced to such an extent that the hairspring will return the pointer to a position indicating the actual pressure, such as by moving the magnet farther from the part of magnetic material, or inserting a shield therebetween.

An object of this invention is to provide a maximum pointer instrument in which friction is employed for retaining the pointer in maximum position with respect to the dial face.

Another object of this invention is to provide such an instrument in which the friction is induced and controlled magnetically.

Still another object is to provide a maximum pointer assembly in which the magnetic force used to control the friction between relatively movable parts may be readily decreased to permit the pointer to indicate the actual condition.

A further object of this invention is to provide an instrument of the above type in which a maximum pointer assembly is subjected to uniform friction throughout its movement.

A still further object is to provide such a maximum pointer instrument in which the position of the hand cannot be controlled manually except by reducing the friction to permit the hand to be moved toward zero position by the action of the hairspring or other return means.

An additional object of this invention is to provide a maximum pointer attachment which may be applied to conventional instruments or employed in instruments made largely with conventional parts.

Further objects and advantages will be apparent from the following description and claims when taken in conjunction with the drawings, in which:

FIGURE 1 is a front elevational view of a pressure gauge embodying the present invention with the front cover and instrument dial removed;

FIG. 2 is a vertical cross-sectional view taken on the line 2—2 of FIG. 1;

FIG. 3 is a view similar to FIG. 1 of a modified pressure gauge; and

FIG. 4 is a vertical cross-sectional view taken on the line 4—4 of FIG. 3.

Referring now to the drawing, and more particularly to FIGS. 1 and 2, there is shown a Bourdon tube pressure gauge 10 embodying the present invention. While this invention is applicable to various types of instruments for indicating pressures, temperatures and other conditions, it is shown herein in connection with a single pointer Bourdon tube pressure gauge. The pressure gauge illustrated comprises a casing 11 having a Bourdon tube 12 positioned therein. One end of the Bourdon tube communicates with the central passageway in a post 14, which in turn communicates with the system, the pressure of which is to be determined. The free end 13 of the Bourdon tube is pivotally connected by a pivot or pin 15 to one end of a link 16 having a longitudinal slot 17 therein adjacent the opposite end, and the slotted end of the link 16 is connected to the indicating mechanism.

The indicating mechanism may comprise a pair of parallel front and rear plates 18 and 19, respectively, secured together in spaced relation by the usual columns or pins 20a. The front plate is secured to the post 14 by suitable securing means, such as screws 19a. A lever 20 is mounted intermediate its ends on an arbor 21 extending between the front and rear plates 18 and 19. One end of the lever 20 is preferably in the form of a gooseneck 22 connected to a pin or pivot member 23 positioned in the slot 17 of the link 16. The opposite end of the lever 20 is in the form of a gear segment 24 which meshes with a pinion 25 fixed on an indicator shaft 26 rotatably mounted in the plates 18 and 19. An instrument pointer or hand 27 of nonmagnetic material is mounted on the indicator shaft 26 adjacent the forward end thereof for movement adjacent the dial 29.

With this construction, as the Bourdon tube 12 tends to straighten out upon an increase of pressure therein, the link 16 and gooseneck end 22 of the lever 20 are moved upwardly causing the lever 20 to be pivoted about the arbor 21 thereby effecting rotation of the pinion 25, shaft 26, and pointer 27. The instrument is also provided with the usual hairspring, 28, connected at one end to the pointer shaft 26 and tending to return the shaft to its initial or zero position. The opposite end of the hairspring may be secured to a column 20a or other fixed support. The movement of the shaft 26 and the pointer 27, due to the actuation of the Bourdon tube 13, is therefore against the slight force exerted by the hairspring 28. Thereafter, upon the reduction of pressure in the Bourdon tube, the free end thereof will move downwardly but, due to the slot in the link 17, such movement will not return the pointer and indicator shaft to zero or initial position. This, however, may be accomplished by the hairspring 28 under certain conditions as explained hereinafter.

As the present gauge is a maximum pointer gauge, it is necessary to retain the pointer at the maximum reading to which it is moved by the action of the Bourdon tube even after the Bourdon tube returns to initial or zero position. As used herein, the terms "zero position" and "initial position" are intended to indicate the original or rest position of the parts before being subjected to the effect of the variable whose condition is to be indicated by the instrument.

In order to maintain the pointer 27 at its maximum position, a disc 30 or other part of magnetic material, such as low coercive intensity steel, may be mounted on the forward end of the indicator shaft 26, as illustrated in FIGS. 1 and 2. Magnetic means may be mounted in the front cover glass 32 of the instrument which is held in place on the front of the instrument casing 11 by the securing ring or bezel 33. A small cup-shaped casing 34, preferably provided with a shoulder 35 for limiting its inward movement, is mounted in an opening provided therefor in the front cover glass 32 with its open side facing inwardly. A permanent magnet 36, preferably held against rotation at all times, is positioned within the casing 34 for movement axially of the casing toward and away from the steel disc 30.

Various means may be provided for axially moving the magnet 36 toward and away from the disc 30. A projection 38 on the knob 37 may extend through the rear of the casing 34 and be fixed to the magnet by a screw 39 or any other suitable means. By pulling the knob outwardly the magnet will be moved away from the disc 30. If desired, a compression spring 40 may be inserted between the rear of the magnet and the casing 34 to return the magnet to its inner position, shown in FIG. 2, although this may not be necessary. Any other suitable means may be employed for moving the magnet away from the disc 30 to reduce the magnetic force therebetween.

In the particular embodiments shown, the indicator shaft 26 is provided with enlargements or collars 41 and 42 closely adjacent the front and rear plates 18 and 19, respectively. The collars 41 and 42 as well as the pinion 25 and any other parts fixed on the shaft are considered as being part of the shaft. The pull of the magnet on the disc 30 tends to pull the indicator shaft 26 forwardly resulting in substantial friction between the forward face of the enlargement or collar 41 and the rear face of the front plate 18. The power of the magnet selected and its normal distance from the disc 30 are such that the resulting friction between the collar 41 and the front plate 18 will be sufficient to maintain shaft 26 and pointer 27 in the maximum position to which moved by the Bourdon tube against the return force exerted by the hairspring 28. However, this friction must not be so great as to interfere with the accuracy of the gauge throughout its entire range.

As the shaft and indicator are held in maximum position solely by the friction between the shaft or some part thereon and the support therefor or other adjacent stationary element, movement of the magnet away from the disc 30 will reduce the friction to such an extent that the hairspring 28 will return the shaft and pointer 27 to a position indicative of the actual condition existing at the time. However, mere rotation of the magnet 36, even if possible, will not change the maximum setting. With the magnet close to the disc 30, friction will prevent rotation of the indicator shaft 26, and as soon as the friction is sufficiently reduced by a reduction in the attraction between the magnet and the disc, the hairspring will cause return movement of the shaft and indicator.

The attraction between the permanent magnet and the steel disc may be readily controlled to produce the exact amount of friction desired by merely varying the normal distance of the magnet from the disc, such as by adjustment of the screw 39.

Referring to FIGS. 3 and 4, a modification of the present invention similar to that shown in FIGS. 1 and 2 is illustrated. However, in the construction of FIGS. 3 and 4, a low coercive steel disc 45 is secured to the rear end of the indicator shaft 26 and a permanent magnet 46 is secured to the inner face of the rear side of the casing 12 by any suitable means, such as a screw 47. The magnet 46 is preferably adjustably mounted so that its normal distance from the disc 45 may be altered.

With this arrangement the pull of the magnet on the disc 45 results in sufficient friction between the rear collar 42 and the front face of the rear plate 19 to retain the shaft 26 and indicator 27 in maximum position. The magnetic force exerted on the disc 45 may be reduced or eliminated by moving a plate 50 of soft iron or other suitable shielding material between the magnet 46 and the disc 45, thereby reducing the friction caused by the magnetic pull and permitting the hairspring 28 to return the indicator shaft and pointer to the actual reading position. The shielding plate 50 may be fixed to the shaft 51 of a knurled knob 52 positioned outside the casing 12. A spacer 53 is positioned about the shaft 51 to locate the plate 50 so that, upon rotation of the knurled knob 52, it will be moved between the magnet 46 and the steel disc 45.

Although the present invention has been described in connection with maximum pointer instruments having a single pointer, similar arrangements for magnetically inducing friction may be employed in maximum pointer instruments having both an indicating pointer and a maximum pointer mounted on separate shafts.

It is also to be understood that various arrangements may be employed for mounting the indicator shaft and magnetically inducing the necessary friction between the shaft or some part associated therewith and a stationary part of the gauge.

While particular embodiments of this invention have been illustrated and described, it will be understood, of course, that the invention is not to be limited thereto since many modifications may be made, and it is contemplated, therefore, by the appended claims, to cover any modifications that come within the true scope of this invention.

I claim:

1. An indicating instrument comprising a casing including a cover, a condition-sensitive element movable upon variation of said condition from a zero position, an indicator shaft mounted for rotation in said supporting structure and having a single pointer fixed thereon, said shaft having a friction part adjacent said supporting structure for engagement with said supporting structure upon axial bias of said shaft in one direction, unidirectional transmission means connecting said condition-sensitive element and said shaft, said transmission means effecting rotation of said shaft from its zero position upon movement of said condition-sensitive means from its zero position, means tending to return said shaft to zero position, said shaft having thereon adjacent one end a part of magnetic material, and a magnet positioned on said instrument sufficiently close to said magnetic part to bias said shaft axially in said direcon and develop friction between said friction part and said support sufficient to overcome the tendency of said return means to rotate said shaft towards zero position, and means for reducing the magnetic force of said magnet on said magnetic part to permit said return means to rotate said shaft to zero position.

2. The indicating instrument of claim 1 in which said magnet is mounted on said casing.

3. The indicating instrument of claim 1 having a movable shielding member which may be moved between said magnet and said magnetic part to reduce the magnetic force which is exerted by said magnet on said magnetic part.

4. The indicating instrument of claim 1 in which the magnet is movable toward and away from said magnetic part to control the magnetic force exerted by said magnet on said magnetic part.

5. The indicating instrument of claim 1 in which the pointer is formed of nonmagnetic material.

6. An indicating instrument comprising a casing including a cover, a Bourdon tube, a supporting structure, an indicator shaft mounted for rotation in said supporting structure and having a single pointer fixed thereon, said shaft having a friction part adjacent said supporting structure for engagement with said supporting structure upon axial bias of said shaft in one direction, unidirectional transmission means connecting the free end of said Bourdon tube and said shaft, said transmission means effecting rotation of said shaft from its zero position upon increase of pressure in said tube, means tending to return said shaft to zero position, said shaft having thereon adjacent one end a part of magnetic material and a magnet positioned on said instrument sufficiently close to said magnetic part to bias said shaft axially in said one direction and develop friction between said friction part and said support sufficient to overcome the tendency of said return means to rotate said shaft towards zero position and means for reducing the magnetic force of said magnet on said magnetic part to permit said return means to rotate said shaft to zero position.

7. The indicating instrument of claim 6 in which said magnet is mounted on said casing.

8. The indicating instrument of claim 6 having a movable shielding member which may be moved between said magnet and said magnetic part to reduce the magnetic force which is exerted by said magnet on said magnetic part.

9. The indicating instrument of claim 6 in which the magnet is movable toward and away from said magnetic part to control the magnetic force exerted by said magnet on said magnetic part.

10. The indicating instrument of claim 6 in which the pointer is formed of nonmagnetic material.

References Cited in the file of this patent

UNITED STATES PATENTS

| | | |
|---|---|---|
| 1,166,719 | Shebol et al. | Jan. 4, 1916 |
| 2,176,263 | Klein et al. | Oct. 17, 1939 |
| 2,836,977 | Cook | June 3, 1958 |

FOREIGN PATENTS

| | | |
|---|---|---|
| 562,621 | Great Britain | July 10, 1944 |